US012798486B2

(12) United States Patent
Hayes et al.

(10) Patent No.: US 12,798,486 B2
(45) Date of Patent: Nov. 17, 2026

(54) VEHICLE STEP SYSTEM

(71) Applicant: Rock-Slide Engineering, LLC, North Logan, UT (US)

(72) Inventors: Mark David Hayes, Smithfield, UT (US); Eli Walker, North Logan, UT (US)

(73) Assignee: ROCK-SLIDE ENGINEERING, LLC, North Logan, UT (US)

( * ) Notice: Subject to any disclaimer, the term of this patent is extended or adjusted under 35 U.S.C. 154(b) by 199 days.

(21) Appl. No.: 18/791,146

(22) Filed: Jul. 31, 2024

(65) Prior Publication Data

US 2025/0058713 A1 Feb. 20, 2025

Related U.S. Application Data

(60) Provisional application No. 63/533,069, filed on Aug. 16, 2023.

(51) Int. Cl.
*B60R 3/02* (2006.01)

(52) U.S. Cl.
CPC .................................... *B60R 3/02* (2013.01)

(58) Field of Classification Search
CPC ........ B60R 3/02; B61D 23/00; B61D 23/025; E06C 1/38
See application file for complete search history.

(56) References Cited

U.S. PATENT DOCUMENTS 2,153,946 A * 4/1939 Linstead .................. B60R 3/02 105/447
4,116,457 A * 9/1978 Nerem ..................... B60R 3/02 280/166
5,957,237 A 9/1999 Tigner
6,213,486 B1 4/2001 Kunz et al.
7,025,174 B1 * 4/2006 Hawley .................... B60R 3/02 182/127
7,168,722 B1 1/2007 Piotrowski
7,448,637 B2 * 11/2008 Parker .................... E06C 1/005 280/166
8,196,865 B2 6/2012 Martin
8,297,635 B2 10/2012 Ziaylek
8,556,283 B2 10/2013 Coochesfahani
8,668,217 B2 3/2014 Ziaylek

FOREIGN PATENT DOCUMENTS

FR 2368388 A1 5/1978
GB 2536245 A 9/2016
KR 102045457 B1 11/2019

OTHER PUBLICATIONS

ETRAILER, Flexco Manual Pull-Out Steps for RVs—Double—8" Drop/Rise—24" Wide—300 lbs, Retrieved on Oct. 24, 2023 (publication believed 2023), pp. 2-4, https://www.etrailer.com/RV-and-Camper-Steps/Stromberg-Carlson/SMFP-2100.html.

* cited by examiner

*Primary Examiner* — Steve Clemmons
(74) *Attorney, Agent, or Firm* — Preston P. Frischknecht; Project CIP

(57) ABSTRACT

A vehicle step system with a rectangular body and a step portion stowable in and extendable from the rectangular body. The step portion has first and second steps with a bi-folding assembly. The rectangular body encases the step portion in a stowed position with the first step stacked on top of the second step. In the extended position, the first step is forward of and lower than the rectangular body, whereas the second step is forward of and above the rectangular body.

14 Claims, 12 Drawing Sheets

VEHICLE STEP SYSTEM

RELATED APPLICATIONS

This application is the non-provisional version of provisional U.S. Pat. App. No. 63/533,069, filed on Aug. 16, 2023. This application claims priority to U.S. Pat. App. No. 63/533,069 and fully incorporates it herein, in addition to the below description, by specific reference.

BACKGROUND OF THE INVENTION

Automatic steps have grown in popularity, for example, as accessories for JEEP® brand vehicles, SUVs, rock crawlers, trucks and other vehicles. However, there are limited options for consumers looking for smaller steps (e.g., bed, rack, or ancillary rocker guard-type steps) that provide additional functionality to OEM vehicles by facilitating easier user access to different portions, sides, elevations, or features of the vehicle, such as a truck bed.

SUMMARY OF THE INVENTION

In accordance with the above, a new vehicle step system is provided. The step system includes a generally rectangular body portion and a step portion configured to fit within the generally rectangular body portion. The step portion has first step and second steps with one or more support members located between and connecting the steps. The step portion is configured to rest generally horizontally within the generally rectangular body portion in a retracted position; move back and forth generally horizontally with respect to the generally rectangular body portion through various intermediate positions along a longitudinal axis parallel to the direction of horizontal travel; and then pivot to and from a more vertical orientation along one or more axes perpendicular to the longitudinal axis to and from a fully extended or deployed position. In certain embodiments, this may be accomplished through a step portion cartridge system wherein support members fold and unfold, thereby stacking the steps, between deployment and stowing.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

Figure 1:
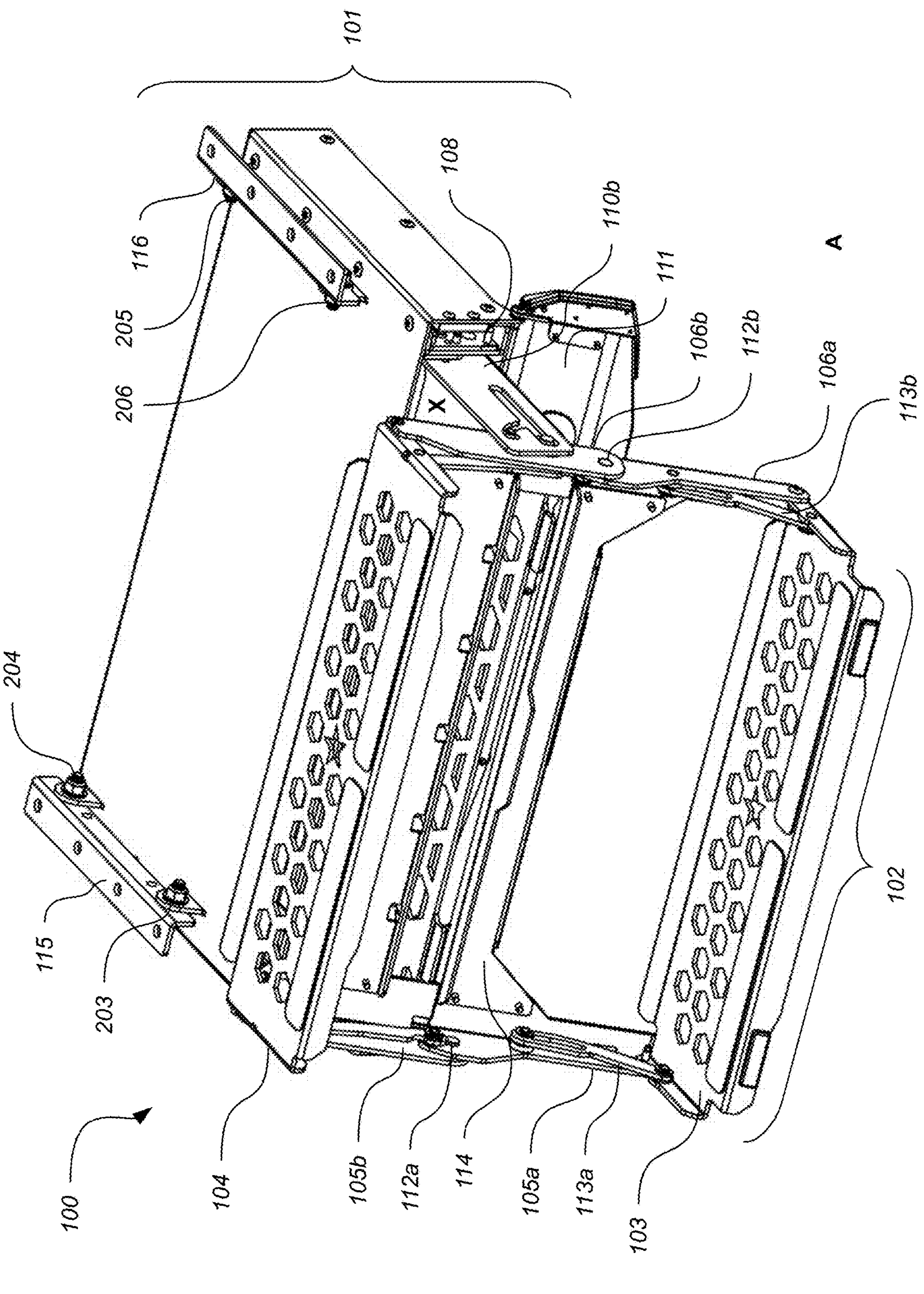
FIG. 1 is a front perspective view of one embodiment of a vehicle step system with steps in fully deployed or extended position.

The present invention in its various embodiments, some of which are depicted in the figures herein, is a vehicle step system. One embodiment of the vehicle step system 100 is shown. The step system 100 includes a generally rectangular body portion 101 and a step portion 102 configured to fit within the generally rectangular body portion 101. The generally rectangular body 101 portion may include one or more of a top, bottom, front, back, left, and/or right sides.

The dimensions of generally rectangular body 101 (and therefore, of the entire vehicle step system) may vary across embodiments. In the illustrated embodiment, for example, the generally rectangular body portion 101 may have a height I, width II, depth III, wherein the width II is approximately five times the height I and the depth III is less than the width II. See FIG. 4.

The step portion 102 is comprised of a first step 103, a second step 104, and one or more primary support members 105, 106 located between and connected to the first 103 and second steps 104. Steps 103, 104 may be pivotable with respect to the primary support members. For example, each of first 103 and/or second 104 steps may rotate at least 180 degrees within the step portion 102 in between stowed B and extended A positions. In the illustrated embodiment, the step portion 102 may have four or more primary support members (e.g., 105*a*, 105*b*, 106*a*, and 106*b*), two on each of left and right step sides. Primary support members on each of left and right sides may pivotally connect at a pivot point 112 and be configured to collapse and/or foldably stack first 103 and second 104 steps. For example, the first step 103 may stack on top of the second step 104 when the step portion 102 is in a stowed position B.

Secondary support members (e.g. 113*a*, 113*b*) may be pivotally attached to steps and/or primary support members in order to create a linkage and/or provide support for one or more steps. One or more tertiary support members 114 may extend between and/or connect primary support members. Support members may, with steps, form a cartridge that is pivotably insertable into the generally rectangular body portion 101.

Primary, secondary, and/or other support members may form a folding assembly that is configured to form a bifold in the step portion. See esp. FIGS. 6-9. The bifold may be located between the first 103 and second 104 steps.

As discussed in more detail below, the step portion 102 is generally configured to: (1) rest horizontally within the generally rectangular body 101 portion when the step portion 102 is in retracted positions B, C; (2) move back and forth horizontally with respect to the generally rectangular body portion through first extending positions D along a longitudinal axis parallel to the direction of horizontal travel; and (3) through second extending positions E, F, G pivot to a more vertical orientation, fully extended, and/or deployed position A along an axis that is perpendicular to its axis of prior horizontal travel.

As one exemplary means to assist in accomplishing the functionality described, the step portion 102 is connected to the generally rectangular body portion 101, in whole or in part, through one or more slide mechanisms on each side. In the illustrated embodiment, a slide mechanism may be comprised of a fixed primary slide portion 107, 108 and a moveable secondary slide portion 109, 110. Secondary slide portion may travel along one or more guide rods, tracks, apertures, and the like that are part of and/or adjacent to the fixed primary slide portion. The precise configuration of one or more slide mechanisms may vary across embodiments without departing from the purpose and scope of the invention.

The step portion 102, one or more slide mechanisms and/or secondary slide portion(s) may further be connected to and/or in communication with one or more chains, belts, and/or gears that, in turn, are in communication with and driven by one or more powered actuators to move the step through the positions described herein. Alternatively, the step portion 102 may be manual and/or user actuated.

Figure 12:
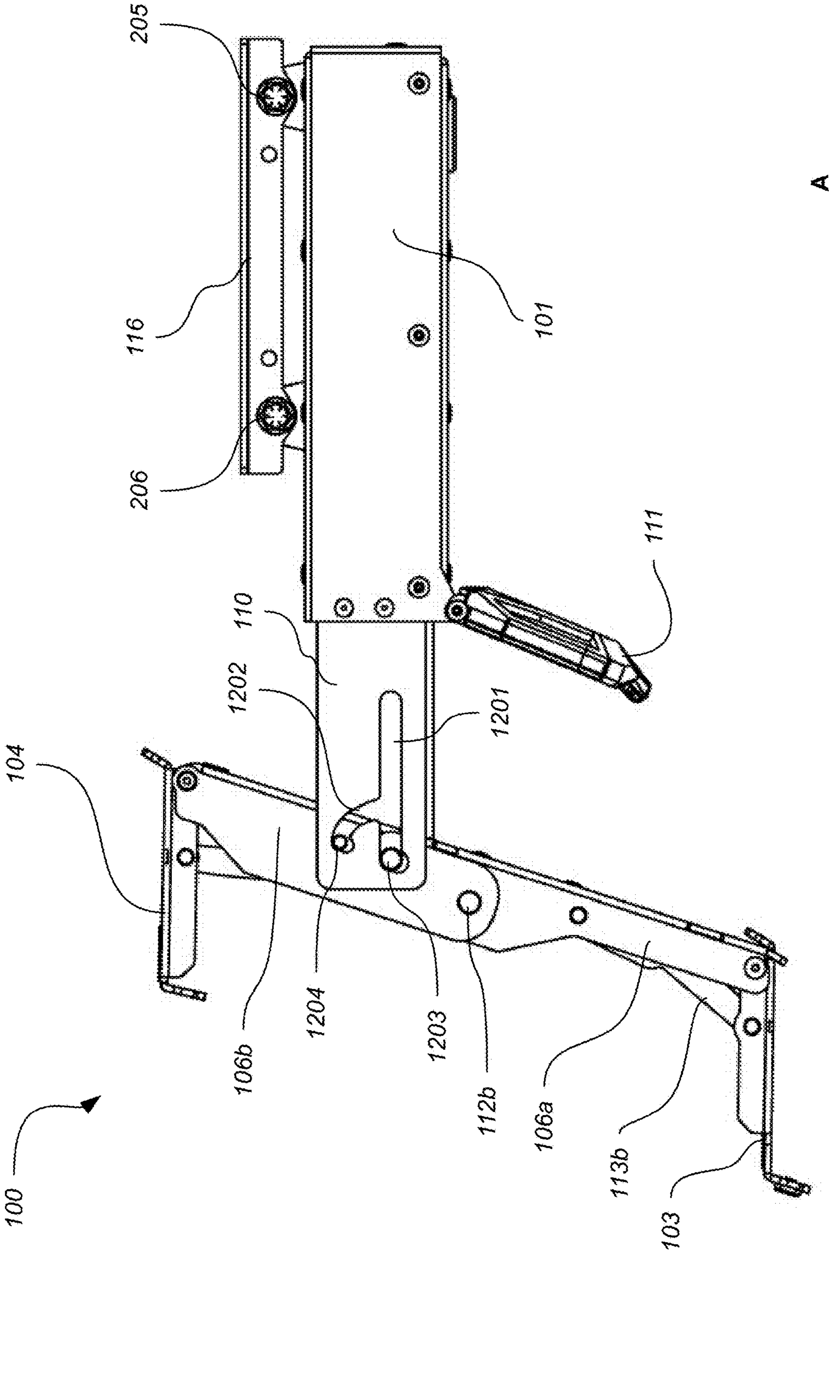
FIG. 12 is a side view of one embodiment of a vehicle step system with steps.

Referring now to FIGS. 12, a linkage comprising a moveable secondary slide portion 110 and support member portion 106*b* are shown in more detail in one embodiment of the invention. Such linkage may be present on each of the left and right sides. Secondary slide portion 110 has a first elongate horizontal aperture 1201 with terminal cutout and a second curved elongate aperture 1202 with terminal cutout stemming from the top of the first elongate horizontal aperture 1201. Support member portion 106*b* has a first protrusion configured to travel within the first elongate horizontal aperture 1201 and a second protrusion configured to travel within the second curved elongate aperture 1202. The protrusions and apertures define paths of travel, stops, and or locking mechanisms for the support corresponding member and ultimately, step portion. Depending on the particular embodiment, a locking mechanism may include one or more of: a toggle, cam-lock, locking pawl, ratchet or other suitable mechanism. In the illustrated embodiment, there is a first linkage on the left of the step and a second linkage on the right side of the step. Across embodiments, linkages are configured to allow the step portion 102 to pivot between a generally horizontal orientation in retracted and/or one or more intermediate positions to a generally vertical orientation in a fully extended position.

Referring generally now to FIGS. 2 through 10, stowed B, extended A, and intermediate step positions C, D, E, F, G are shown, as well as an exemplary path of travel and element movement and positioning between those positions according to the structure of the illustrated embodiment of the invention. The exemplary step movement described herein relates to movement between stowed B and extended A positions. Although specific, and discrete movements are described herein, these are set forth for exemplary purposes only; other movements may combine to form a single fluid and/or continuous motion and other positions or movements may be included without departing from the purposes and/or scope of the invention.

Figure 2:
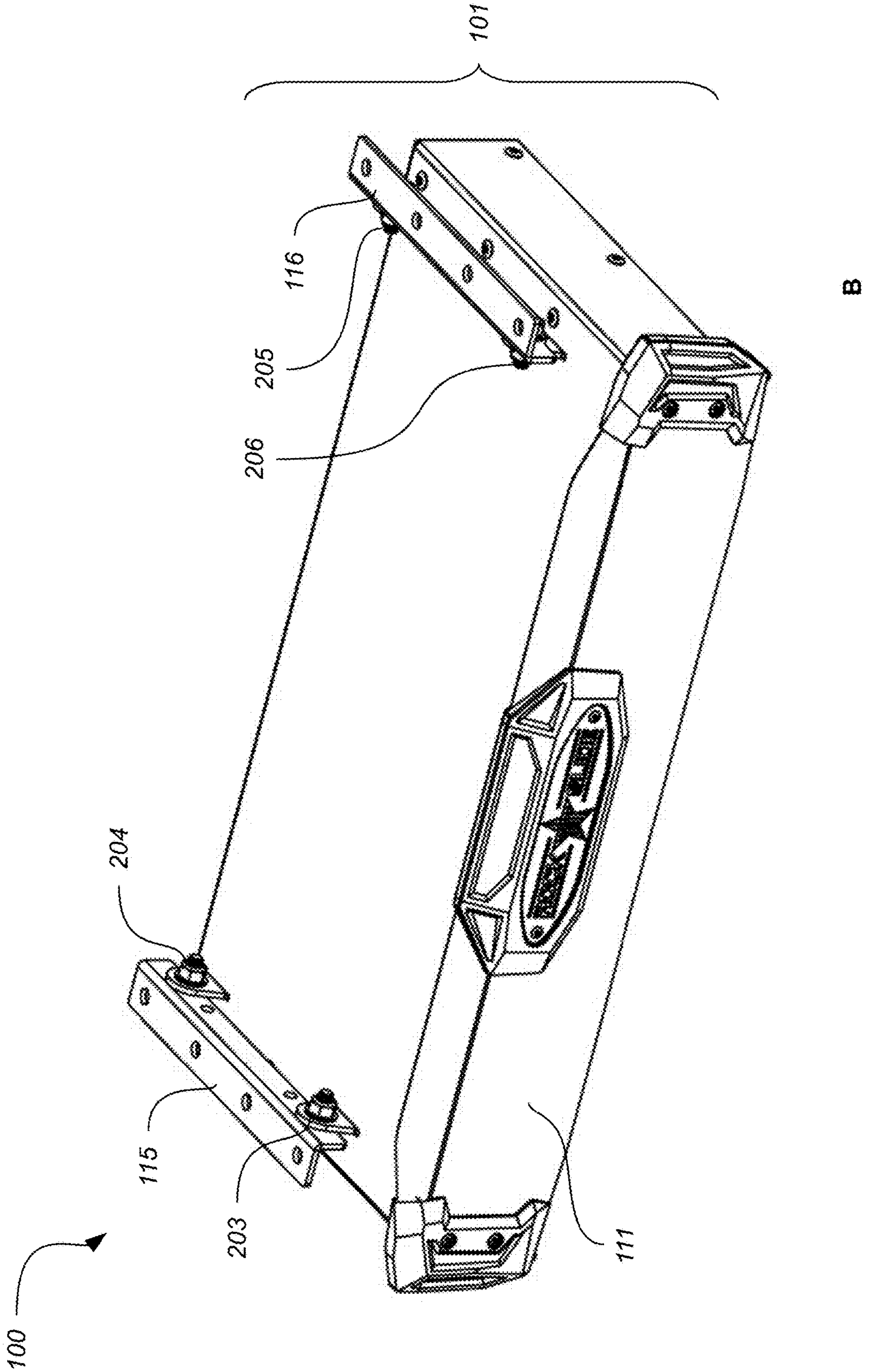
FIG. 2 is a front perspective view of one embodiment of a vehicle step system with steps in a fully retracted or stowed position.
Figure 3:
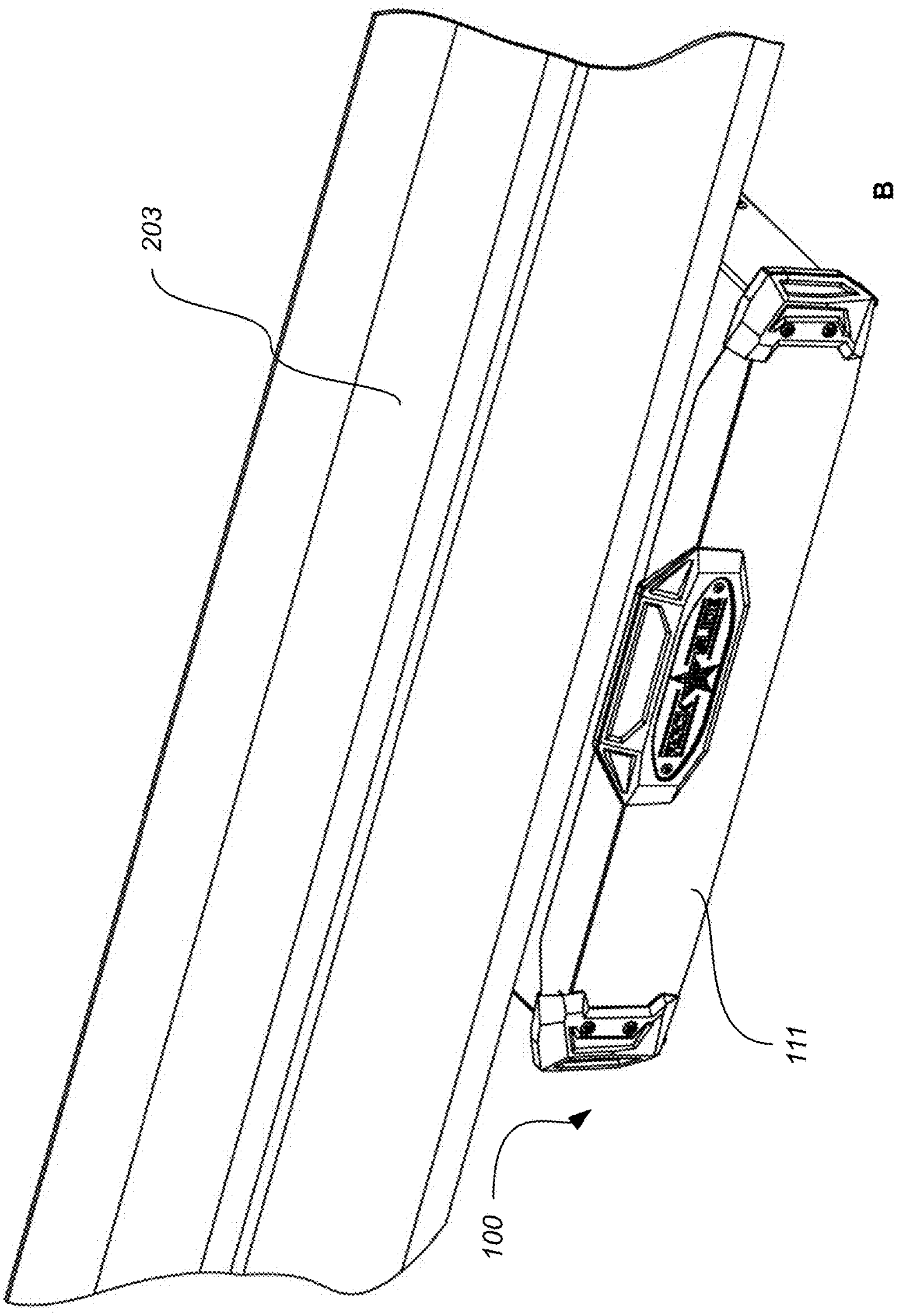
FIG. 3 is a front perspective view of one embodiment of a vehicle step system with steps in a fully retracted or stowed position in a vehicle side environment.
Figure 4:
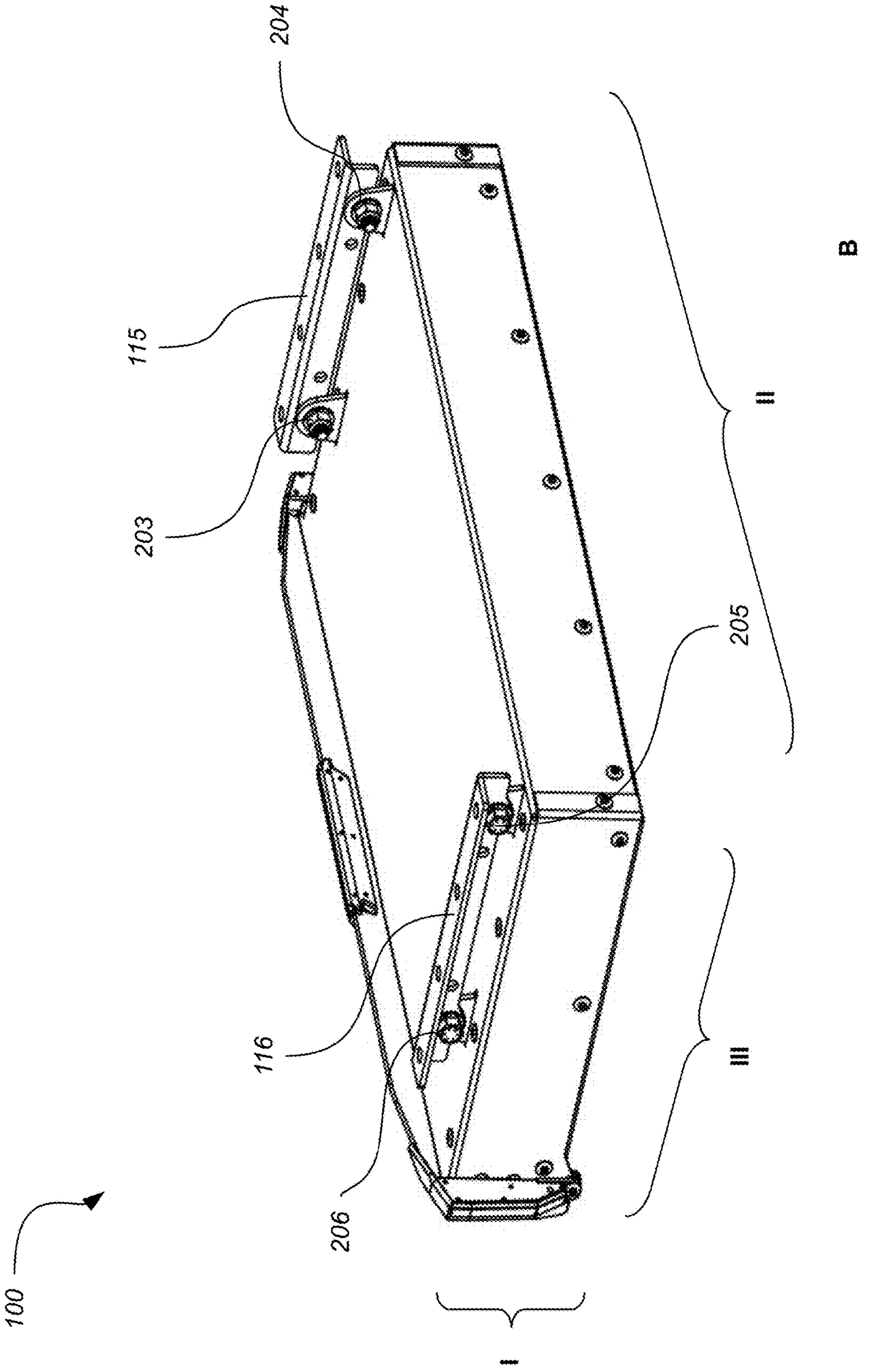
FIG. 4 is a rear perspective view of one embodiment of a vehicle step system with steps in a fully retracted or stowed position.

In FIG. 2 through 4, the step portion 102 is shown in fully retracted position B. The step portion 102 is in a generally horizontal orientation with portions of the slide mechanism to the rear of the rectangular body portion 101. The step portion 102 is enclosed within the rectangular body portion 101. In certain embodiments, the rectangular body 101 partially, substantially, and/or fully encases the step portion 102.

Figure 5:
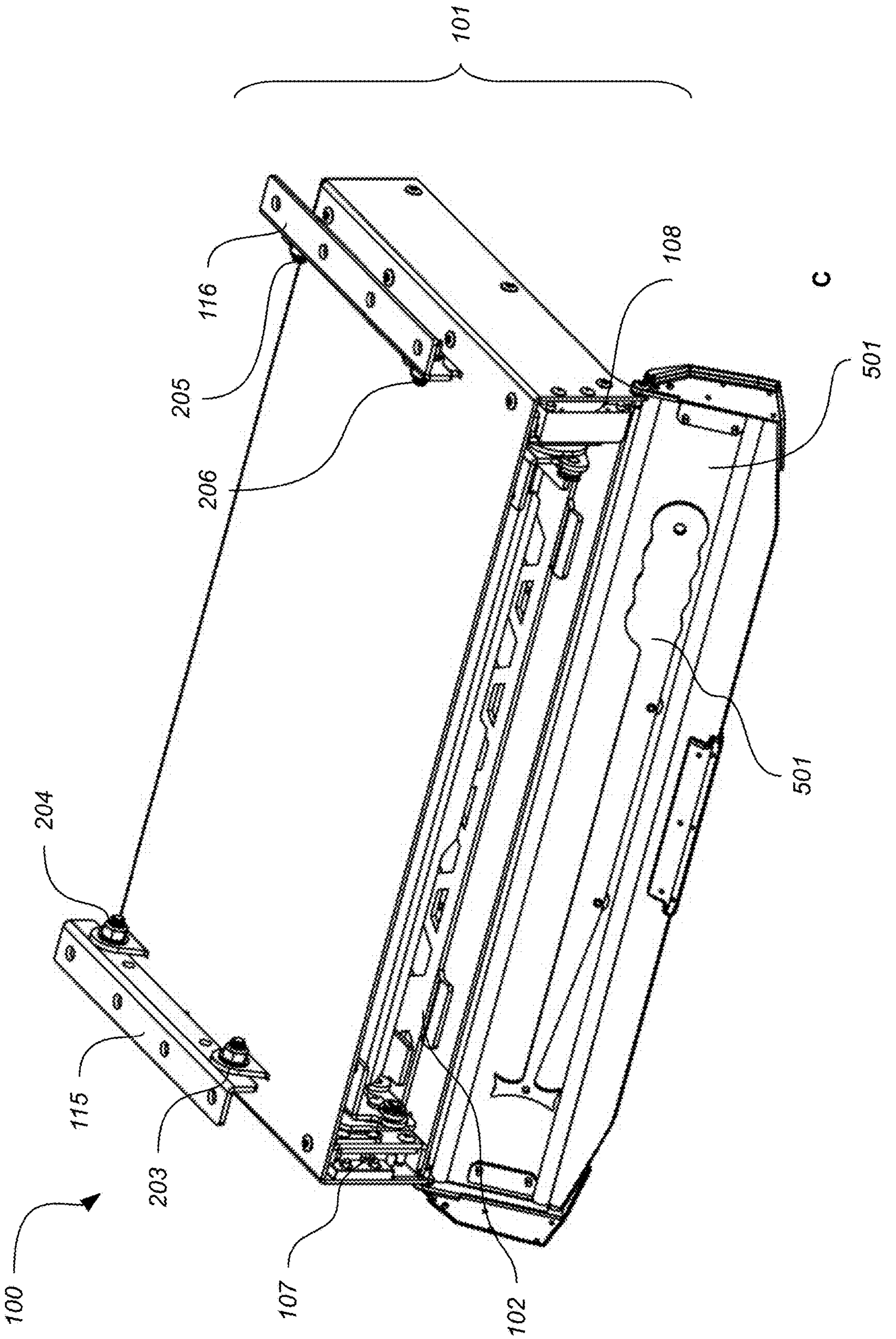
FIG. 5 is a front perspective view of one embodiment of a vehicle step system in a first intermediate position.
Figure 6:
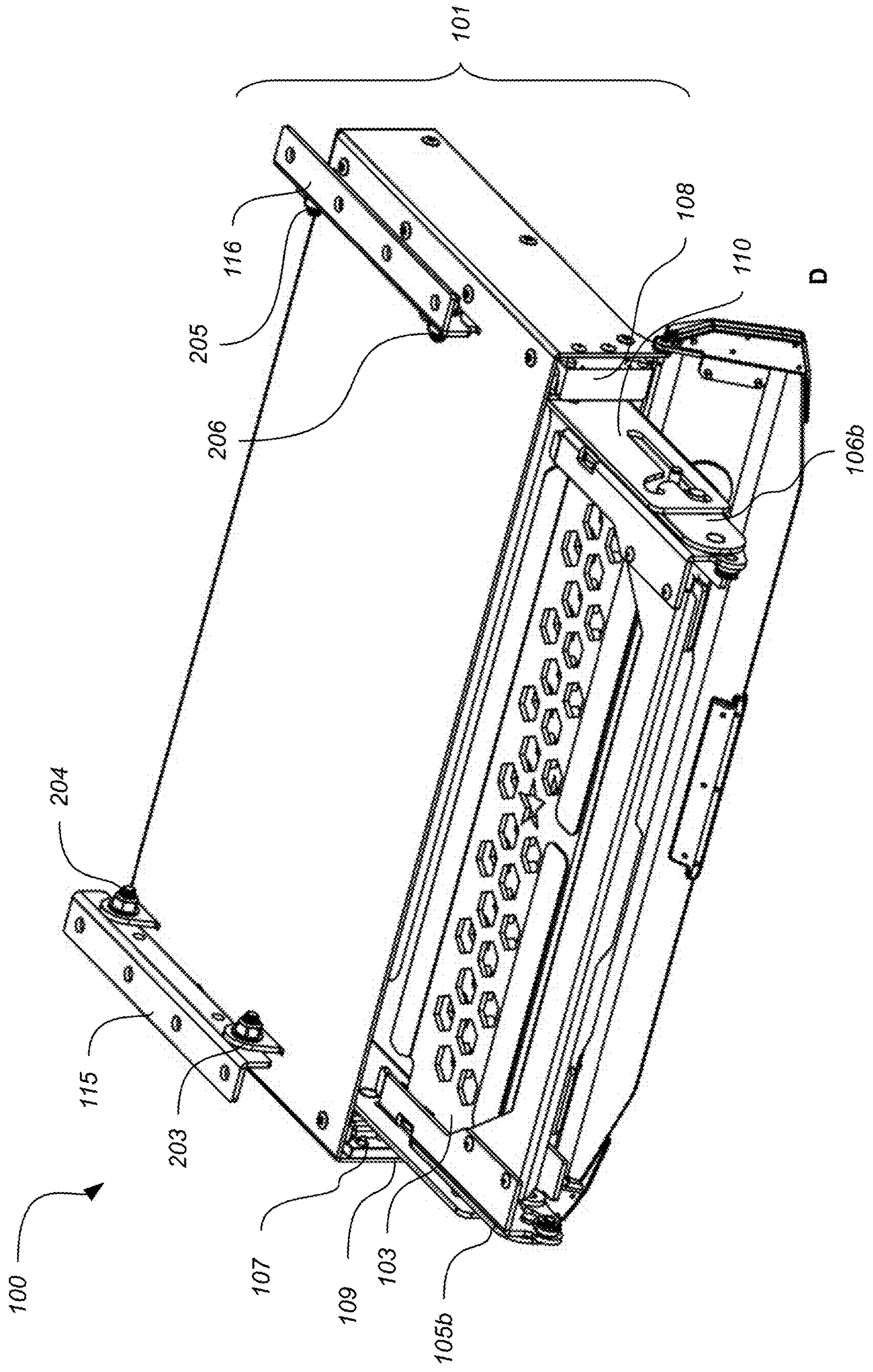
FIG. 6 is a perspective view of one embodiment of a vehicle step system in a second intermediate position.
Figure 7:
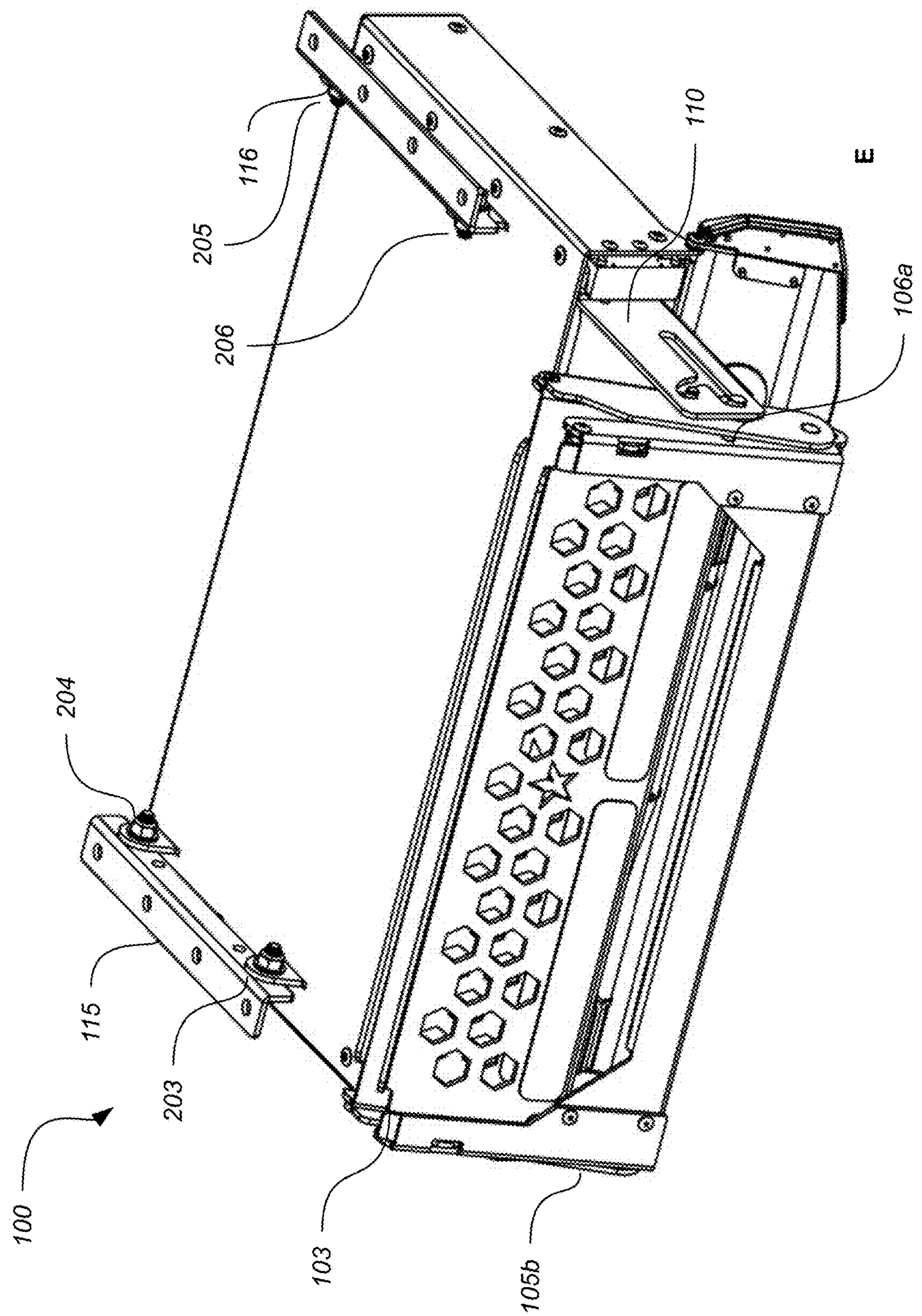
FIG. 7 is a perspective view of one embodiment of a vehicle step system in a third intermediate position.
Figure 8:
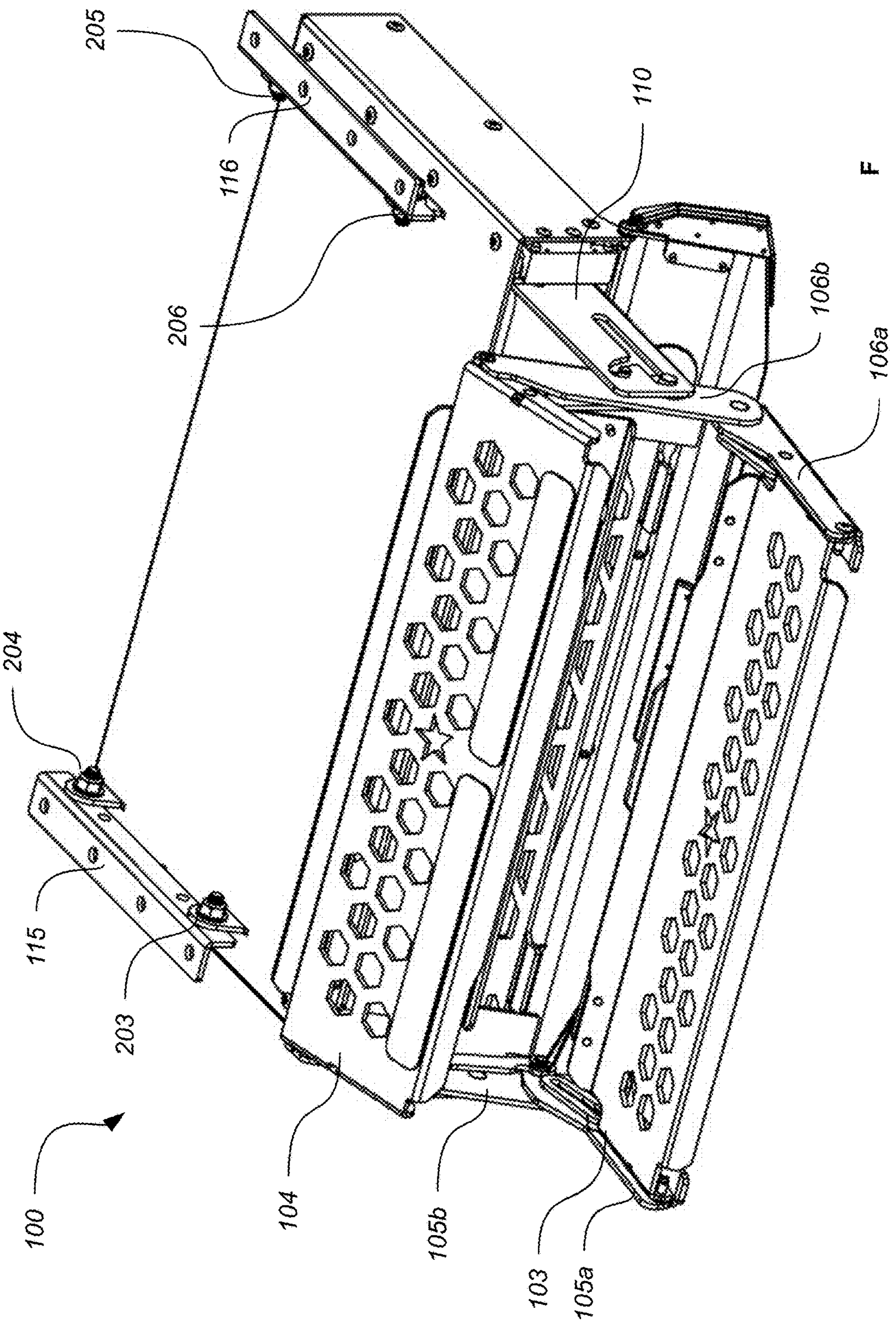
FIG. 8 is a perspective view of one embodiment of a vehicle step system in a fourth intermediate position.
Figure 9:
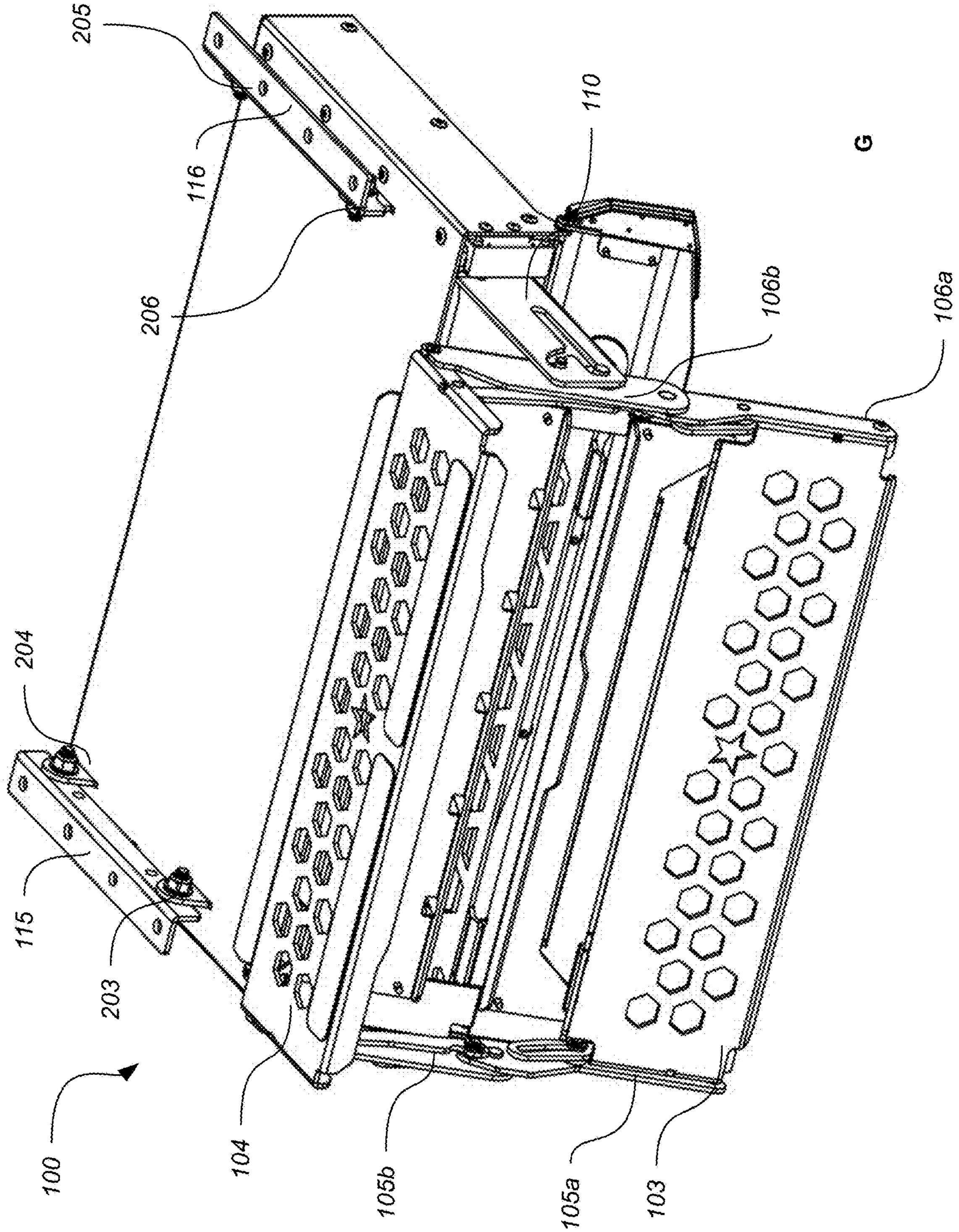
FIG. 9 is a perspective view of one embodiment of a vehicle step system in a fifth intermediate position.
Figure 10:
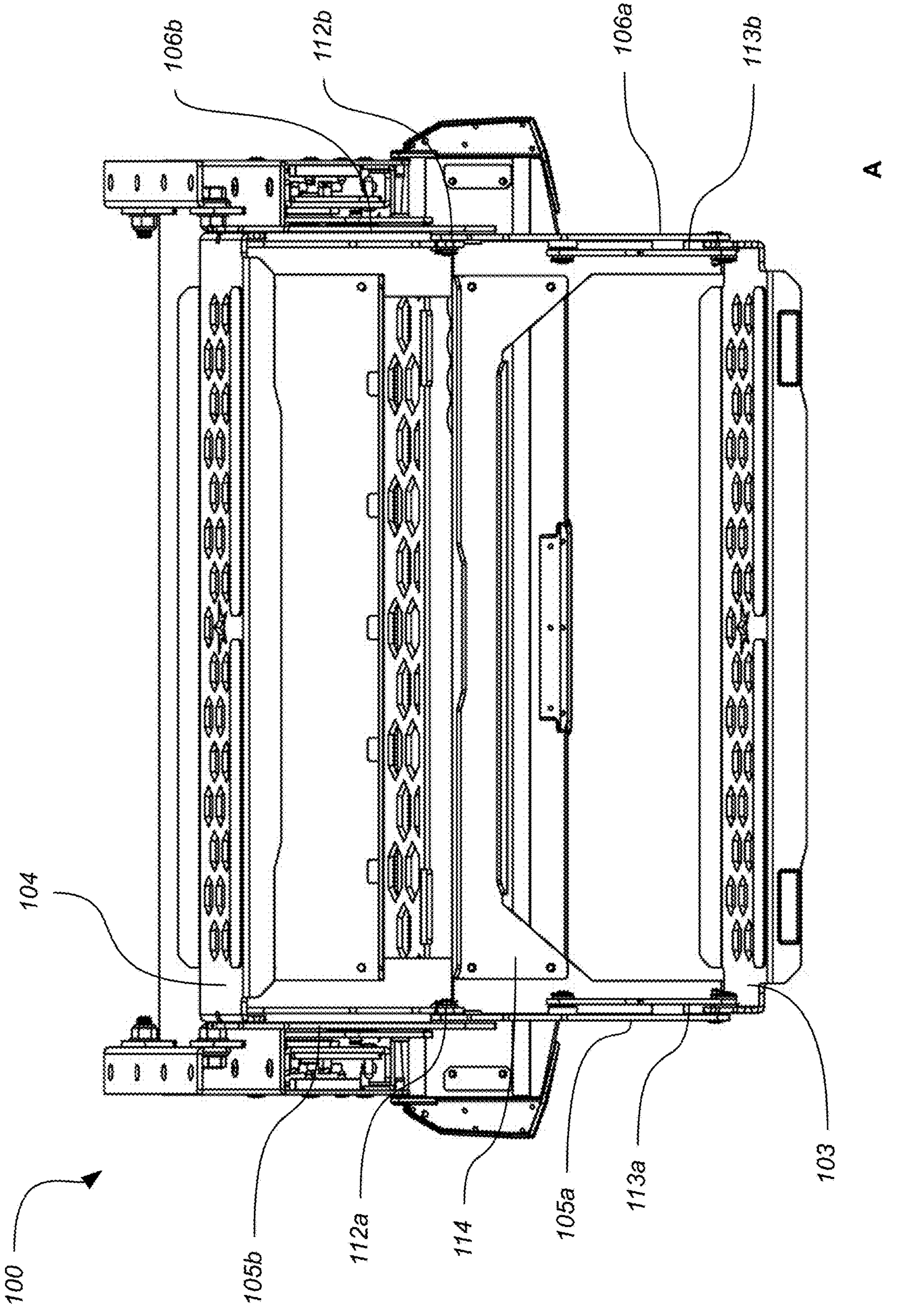
FIG. 10 is a front view of one embodiment of a vehicle step system with steps in a fully deployed or extended position.
Figure 11:
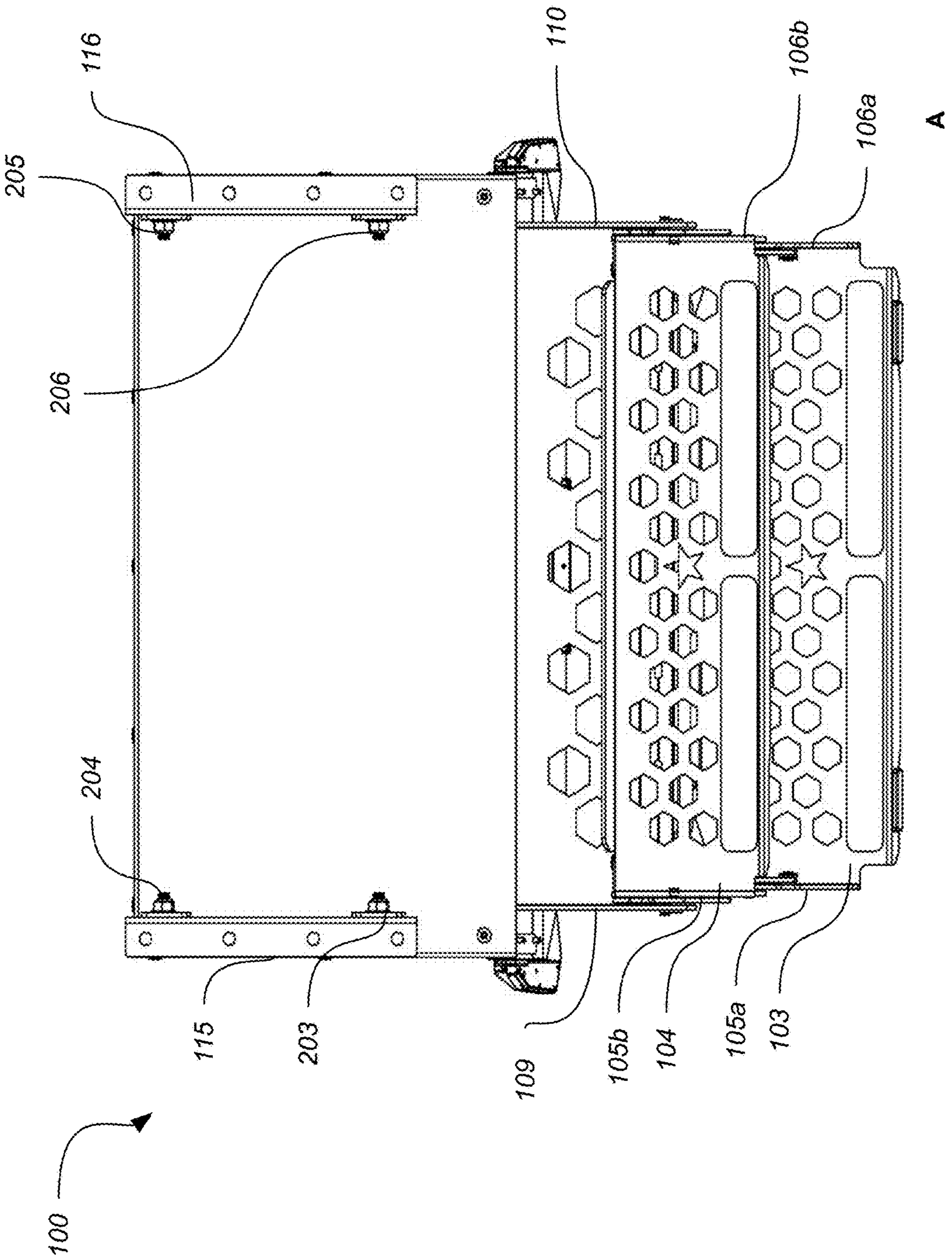
FIG. 11 is a top view of one embodiment of a vehicle step system with steps in a fully deployed or extended position.

In FIG. 5, the step portion 102 is still shown in fully retracted position, but a door 111 of the rectangular body portion 101 is open in a new position C in preparation for the step to deploy. In some embodiments, a step cleaning tool 501 is removably attachable to the body portion door 111. The door 111 is not configured as a step. In FIG. 6, the step portion 102, as a cartridge, begins to slide forward horizontally from the rectangular body portion with the aid of the slide mechanism in position D. In FIG. 7, the step portion 102 pivots upward within the apertures of the secondary slide portion and the steps begin to unfold, unstack, and/or scissor open in position E. In FIG. 8, the step portion 102 continues to unfold, unstack, and or scissor open in position F. In FIG. 9, the primary support members of the step portion 102 are fully extended and aligned in position G. The second step 104 is in its final deployed position while the first step 103 is in a position parallel to the primary support members, and not in a final deployed position. In FIG. 10, the first step 103 is pivoted downward in a final deployed position A supported by the support members. In the extended position, the first step 103 is configured to position generally forward of and below the generally rectangular body 101 and the second step 104 is configured to position generally forward of an above the generally rectangular body 101. See FIGS. 11 and 12.

The vehicle step system is configured to attach to a vehicle through, for example, brackets and fasteners (115, 116, 203, 204, 205, 206) affixed to and/or releasably attachable at the top of the rectangular body portion 101.

Although the vehicle step system may be used in many different applications, exemplary applications and functional advantages include use of the vehicle step system on the side of a vehicle, and especially on the side of a truck bed in order to obtain access to the truck bed from the outside of the vehicle. For example, the vehicle step system may be mounted forward or rear of a wheel well on the side of a truck bed in order to facilitate ease of access to the truck bed from the outside. In certain embodiments, the dimensions of the step system are configured to optimize clearance by providing a step of minimal profile. Control elements and/or means for moving the step may include one or more of a: (a) manual and/or wired switch (including mounted near or adjacent to the step; inside the bed if a truck; and (b) wireless switch (including a key fob, blue tooth and the like).

The present invention may be embodied in other specific forms without departing from its spirit or essential characteristics. For example, while in certain embodiments the step portion may fold and unfold, other embodiments may incorporate slide or telescopic structures in order to deploy and/or stow the step portion into the generally rectangular body. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A vehicle step system comprising:

a generally rectangular body configured to attach to a vehicle;

a step portion connected to the generally rectangular body, with a first step and a second step, and configured move between a stowed position and an extended position substantially out of the generally rectangular body;

wherein, in the stowed position, the generally rectangular body is configured to encase the step portion;

wherein, in the extended position, the first step is configured to position generally forward of and below the generally rectangular body and the second step is configured to position generally forward of and above the generally rectangular body; and wherein the step portion is configured to move between the stowed position and the extended position, at least in part, through a folding assembly configured to form a bifold in the step portion between the first step and second step.

2. The vehicle step system of claim 1, wherein the first step is configured to stack on top of the second step when the step portion is in the stowed position.

3. The vehicle step system of claim 1, wherein the first and second steps are configured to rotate within the step portion between the stowed position and the extended position.

4. The vehicle step system of claim 1, further comprising a door attached to the front of the generally rectangular body, wherein the door is not a step.

5. The vehicle step system of claim 1, wherein the first step rotates at least 180 degrees within the step portion from the stowed position to the extended position.

6. The vehicle step system of claim 1, wherein the step portion is manually actuated by a user to move between the stowed position and the extended position.

7. A vehicle step system comprising:

a generally rectangular body configured to attach to a vehicle, the generally rectangular body having a front door configured to open and close, the front door not a step;

a step portion connected to the generally rectangular body, with a first step and a second step, and configured move between a stowed position in and an extended position substantially out of the generally rectangular body;

wherein, in the stowed position, the generally rectangular body is configured to substantially encase the step portion;

wherein, in the extended position, the first step is configured to position generally forward of and below the generally rectangular body and the second step is configured to position generally forward of and above the generally rectangular body and wherein the step portion is configured to move between the stowed position and the extended position, at least in part, through a folding assembly configured to form a bifold in the step portion between the first step and second step.

8. The vehicle step system of claim 7, wherein the first step is configured to stack on top of the second step when the step portion is in the stowed position.

9. The vehicle step system of claim 7, wherein the first and second steps are configured to rotate within the step portion between the stowed position and the extended position.

10. The vehicle step system of claim 7, wherein the first step rotates at least 180 degrees within the step portion from between the stowed position and the extended position.

11. The vehicle step system of claim 7, wherein the step portion is manually actuated by a user to move between the stowed position and the extended position.

12. A vehicle step system comprising:

a generally rectangular body configured to attach to a vehicle and having a front door that is not a step;

a step portion connected to the generally rectangular body, with a first step and a second step, and configured move between a stowed position in and an extended position substantially out of the generally rectangular body, at least in part, through folding assembly configured to form a bifold in the step portion between the first step and second step;

wherein, in the stowed position, the generally rectangular body is configured to fully encase the step portion and the first step stacks on top of the second step;

wherein, in the extended position, the first step is configured to position generally forward of and below the generally rectangular body and the second step is configured to position generally forward of and above the generally rectangular body; and wherein the first step and second step are configured to rotate with the step portion between the stowed and extended positions.

13. The vehicle step system of claim 12, further comprising a elongate step cleaning tool configured to releasably attach to the front door.

14. A vehicle step system comprising:

a generally rectangular body configured to attach to a vehicle;

a step portion connected to the generally rectangular body, with a first step and a second step, and configured move between a stowed position and an extended position substantially out of the generally rectangular body;

wherein, in the stowed position, the generally rectangular body is configured to encase the step portion;

wherein, in the extended position, the first step is configured to position generally forward of and below the generally rectangular body and the second step is configured to position generally forward of and above the generally rectangular body; and wherein the first step is configured to stack on top of the second step when the step portion is in the stowed position.

* * * * *